United States Patent [19]

Duval et al.

[11] Patent Number: 5,451,755
[45] Date of Patent: Sep. 19, 1995

[54] SELF-CONTAINED DEVICE FOR SELF-SERVICE DELIVERY OF ELECTRICAL ENERGY

[75] Inventors: Catherine Duval, Villeurbanne; Georges Laenen; Florence Le Grevellec, both of Lyons; Jean-Louis Riberolles, Caluire, all of France

[73] Assignee: Electricite De France (EDF), France

[21] Appl. No.: 128,587

[22] Filed: Sep. 28, 1993

[30] Foreign Application Priority Data

Oct. 6, 1992 [FR] France ................. 92 12257

[51] Int. Cl.⁶ .................................. G06F 7/08
[52] U.S. Cl. ..................... 235/381; 235/384; 235/379; 902/23
[58] Field of Search ........... 235/381, 379, 384; 902/23

[56] References Cited

U.S. PATENT DOCUMENTS 4,237,799 12/1980 Berman ................. 902/35
4,312,436 1/1982 Martin et al. .
4,532,418 7/1985 Meese et al. .
5,269,521 12/1993 Rossides ................. 902/23

FOREIGN PATENT DOCUMENTS 0375468 6/1990 European Pat. Off. .
0479290 10/1991 European Pat. Off. .

*Primary Examiner*—Harold Pitts
*Attorney, Agent, or Firm*—Harris Beach & Wilcox

[57] ABSTRACT

A self-contained device for self-service delivery of electrical energy, comprising a plurality of terminals, each capable of being connected to an electrical appliance, and a central management unit, operable independently of the terminals. The central management unit serves to: (1) manage distribution of electricity from an electrical supply grid to each of the terminals, (2) manage interaction between a prepayment instrument and users of the terminals, and (3) manage connection of the terminals to the electrical supply grid for transmission of electricity therebetween for either a period of time or a quality of electricity, as determined in response to a signal from the prepayment instrument indicating prepayment by a user.

14 Claims, 2 Drawing Sheets

SELF-CONTAINED DEVICE FOR SELF-SERVICE DELIVERY OF ELECTRICAL ENERGY

The invention relates to a novel device, which can allow electrical energy to be delivered and supplied, and to do this in self-service. It relates to such a device quite particularly intended for use outside living premises, in particular in public places, and for applications outside domestic use.

BACKGROUND OF THE INVENTION

1. Field of the Invention

Numerous users, especially but not exclusively road users, have requirements for electrical energy, in order, during their successive stops, either to preserve the quality of the freight which they are transporting, or to enjoy a minimum level of comfort, or alternatively to have available an energy source which can allow them to carry out their daily activity.

This is the case for road haulers, in particular of refrigerated road haulage units, who are obliged to stop regularly, and who, in order to keep the perishable foodstuffs which they are transporting completely fresh, need to activate a heat engine, independent of the motor for driving the truck proper, and necessary for ensuring the operation of the on-board refrigeration unit given the task of keeping the temperature-regulated trailer containing said foodstuffs at a low temperature. These heat engines, in general diesel motors, generate, in addition to pollution of the surrounding air, pollution inherent to the noise as well.

Currently, this type of truck almost routinely uses an electric motor, which can ensure the operation of the on-board refrigeration unit. Now, except in public corporations, there is currently no self-contained system for electrical supply, in particular in rest areas, parking areas, etc., which can make it possible to supply these electric motors.

However, this problem also concerns enthusiasts of camping, trailer camping and those of water sports, who when they respectively obtain a pitch in a campsite or a mooring in a harbor, are required to pay a tariff sum, in order to be able to use an electric power outlet, which tariff sum is independent of the quantity of electricity actually consumed.

This problem also arises for fairground stall holders and other linked activities, and also licensed market traders (market gardeners, etc.), who are also invariably required to hand over a tariff payment to be able to use electricity, in order to operate their carousels and other stands, or heating and/or lighting systems.

Finally, since the number of automobiles with an electric motor is ever increasing, a commercial need will be felt for a device capable of recharging the batteries or accumulators on board said vehicles, and intended to allow the motor to be supplied with electrical energy.

Thus, a real need has appeared, concerning the possibility of being able to use, in particular in public places, rest areas, laybys, camping sites, harbors, etc., or in short outside domestic use, systems capable of delivering electrical energy on demand and directly.

2. Description of the Prior Art

In order to satisfy this demand, an electric energy distributor has been provided, in the form of electricity delivery terminals, incorporating a pre-payment instrument, such as for example described in document U.S. Pat. No. 4,532,418. Each of the terminals incorporates an electricity meter, so that there is no switching between this payment center and the electricity delivery center. This type of distributor therefore has the fatal flaw of being easy to defraud, since it is sufficient for the user to connect on before the meter in order to be able to supply himself with electricity.

In order to overcome this drawback, it was then proposed to break the circuit between the payment center and the electricity delivery center, as for example in document EP-A-0,375,468. The device described comprises electrical energy delivery terminals, and a unit for selling tokens or equivalent systems, which can be inserted at said terminals in order to bring about the actual delivery of electricity. However, said terminals are permanently powered up, so that again, fraud is possible, since the terminals still remain out of the control of the unit for selling tokens.

SUMMARY OF THE INVENTION

The object of the invention is to provide an anti-fraud and anti-vandalism device making it possible to provide, outside domestic use, systems capable upon request of directly delivering electrical energy.

The self-contained device for self-service delivery of electrical energy according to the invention, comprises:
- a plurality of terminals, to which any appliance consuming or receiving electricity can be connected up;
- a central management unit, independent of said terminals, capable of managing, on the one hand, the distribution of electricity at each of the terminals from the electrical supply grid, and, on the other hand, the interaction between a prepayment instrument and the potential users of said terminals, said management unit managing the connecting of the terminals to the electrical supply grid for a duration or for a quantity of energy which are determined after an actual payment operation.

In other words, the invention relates to a self-contained device, of the interactive type, in which a user desiring to use electricity for a given amount of time, pays over by any conventional payment means an appropriate sum in order to be able to use, at a terminal, in particular situated in a public place, the required electricity source. Furthermore, and to solve the problems linked with vandalism and fraud, the invention consists in providing a plurality of electricity delivery terminals proper, and a central management unit, physically independent of said terminals, but directly and immediately managing the connection of said terminals to the electrical supply grid. Thus, in the absence of the authorization given by the central unit, the delivery terminals are never powered up, so that whatever attempts of fraudulent connection at said terminals are made, they remain futile, since these terminals do not receive any electric current.

According to one important feature of the invention, the payment instrument is combined with a keyboard and with a screen within a transaction interface point, also connected to the central management unit, and intended to allow the user, in the scope of the interactivity of the invention, to select the supply time or the quantity of electricity, and correspondingly to display the interactive dialog with the management unit.

In a first embodiment of the invention, the payment instrument consists of a bank card reader, combined with a modem, itself connected to the switched telephone network or integrated services digital network (ISDN) for the connection with the electronic funds transfer center of the bank in question.

In another embodiment of the invention, this payment instrument consists of a reader for payment cards, of the magnetic card, smart card or microchip key type, whose value is decremented on each operation, by means of the central management unit, as a function of the required electricity supply time. Such cards are then marketed by the electricity distribution company.

It may also be envisaged, in the scope of the invention, for the payment instrument to consist of a slot paying machine combined with a banknote reader, which, in conjunction with the management unit, analyzes and measures the actual quantity of the sum deposited before delivering the electricity.

According to the invention, this device comprises a cabinet at which the electrical supply grid terminates, and from which the various connections to the terminals leave, the cabinet furthermore comprising, for each of the links to the terminals, a contactor and a circuit breaker, said contactor being managed by the management unit.

Furthermore, and according to the invention, the door of the cabinet is locked, when it is not being used, but can be opened by unlocking under the control of the management unit in the case of a defect, in particular regarding the insulation, of the installation, following the transaction; it is closed by the central management unit when the circuit breaker in question is re-engaged by the end of the transaction. In this case, the re-engagement of the circuit breaker is carried out manually by the user. In a developed form of the invention, the management unit directly re-engages the circuit breaker automatically, as soon as the insulation defect has disappeared.

In another embodiment, each terminal is provided with its own independent casing and also with its own circuit breaker.

The manner in which the invention may be embodied, and the advantages which result therefrom, will emerge better from the embodiment which follows, given by way of indication and non-limitingly, and supported by the attached figures.

DETAILED DESCRIPTION OF A PREFERRED EMBODIMENT

Although described more particularly in relation to the self-service distribution of electricity in rest areas, parking areas, and intended for use by refrigerated haulage units, it is clear that the invention will not be limited to this single application.

Figure 1:
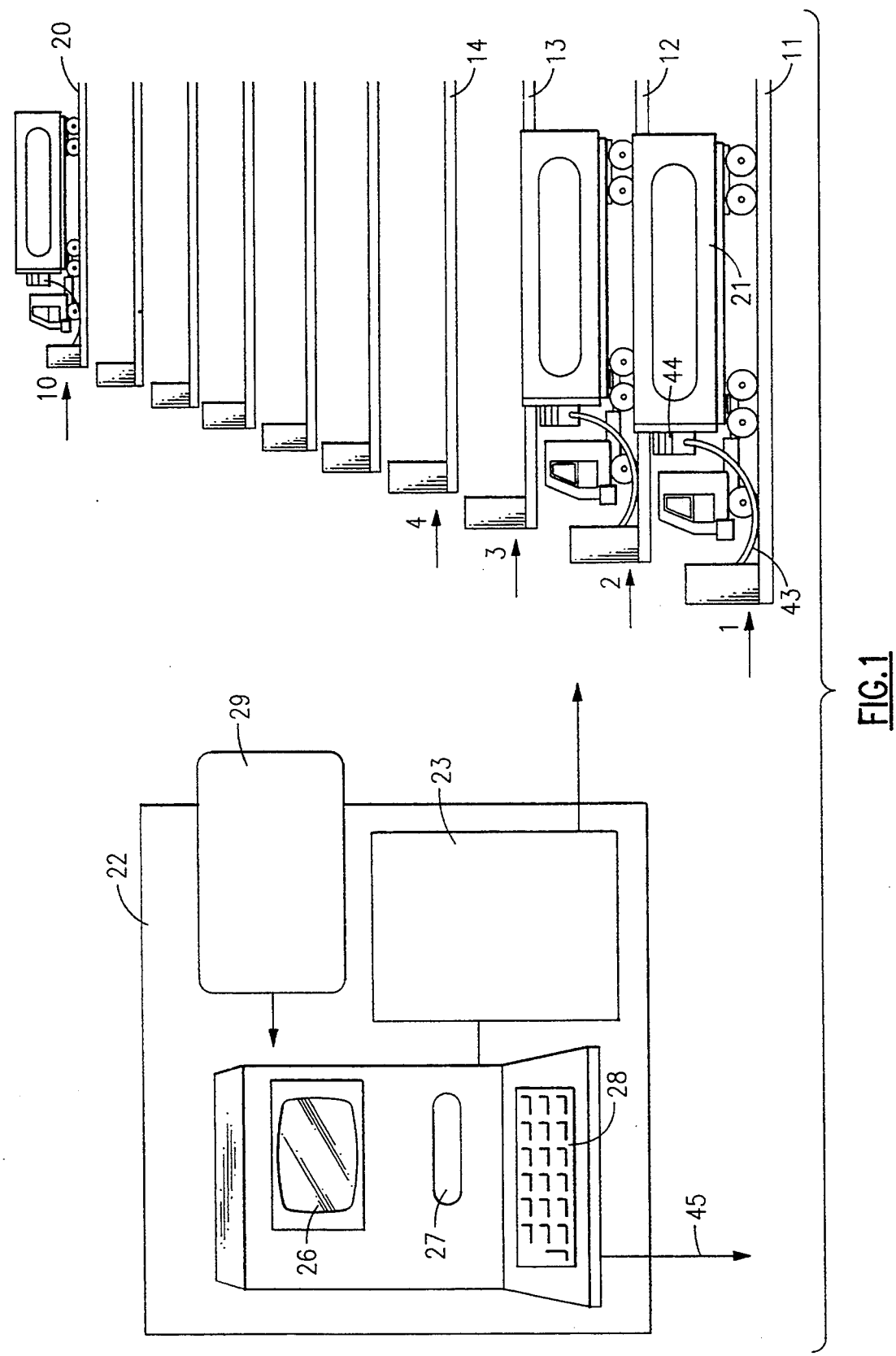
FIG. 1 is a simplified schematic representation of the operation of the installation according to the invention.

The principle of such distribution has been represented schematically in FIG. 1. A layby is provided with various stations referenced (11 to 20), each intended to accommodate a refrigerated truck. In a manner which is known, each of these trucks (21) is fitted with a refrigeration unit (44), capable of operating using a diesel motor, in particular when the truck is being driven, but also by an electric motor. In this case, the electric motor of said unit is linked via a lead (43), which is connected onto one of the terminals referenced (1) to (10), each station (11-20) accommodating a single terminal.

According to the invention, each of these terminals is intended to deliver electricity for a given amount of time. In order to do this, the potential user accesses a management booth (22) intended to allow, on the one hand, choice of the desired electricity supply time, and, on the other hand, the corresponding payment to be made.

This booth (22) basically comprises a transaction interface point (24) fitted:
  with a keyboard (28), intended to allow the user to input responses within the scope of an interactive dialog with said interface point; this keyboard advantageously has anti-vandalism touch-sensitive keys;
  a display screen (26), intended to allow said user to interact with said interface point (24);
  and finally, a prepayment instrument (27).

This transaction interface point (24) is managed by a management unit (30) which itself, as a function of the data which it stores, previously input prior to fitting of the installation, or input by the user by means of the keyboard (28), connects one or more terminals (1-10) whose physical activation and connections are integrated in a cabinet (23).

According to a particularly advantageous embodiment of the invention, the payment instrument (27) consists of a bank card reader (29), of a type known per se. For this purpose, the transaction interface point (45) is connected to the switched telephone network (45), or to the integrated services digital network.

Thus, in this particular embodiment, the first step consists in inserting the card (29) into the reader (27), which, once its detection has been made, causes the start of the interaction to be displayed on the screen (26). This may advantageously start with the selection of a language, in particular from French, English, German, Spanish and Italian, it being clear that the number of languages is in no way limited to this. Furthermore, after the validity of the card has been verified, the interaction continues by the input of the secret code using the keyboard (28), when said card (29) is a smart card. In the case of a magnetic strip card, this step may consist in drawing the card in, which, as is known, makes it easier to read.

It is then possible to proceed with the preparatory phase for supplying electrical energy. This starts with indication of the number of the terminal (1 to 10) to be supplied, then indication of the tariff for the supply in the form of a length of usage, these indications being displayed on the screen (26).

After selection of the length of use, the cost of the supply is then displayed, still on the screen (26), and after the user accepts the conditions, in particular by pushing on any one of the buttons of the keyboard (28), the transaction interface point (24) records the bank transaction, including the sum for the transaction to be made, and advantageously printing a transaction slip. For this purpose, the interface point (24) is provided with a thermal printer (not shown) linked to the central unit, and fitted with a paper cutting system. Correspondingly, the designated terminal is powered up by means of connections ending at a terminal board (36), it being automatically switched off when the allotted time expires.

The account of the user is debited via the interface point (24), and the telephone network (45).

In another embodiment of the invention, the payment instrument (27) consists of a reader for payment cards or keys, each of the cards or keys being in the fashion of telephone cards provided with a value decremented as a function, as in the preceding case, of the length of use of said terminals. The principle of operation remains entirely the same. These cards are marketed in any stores, in particular tobacconists shops.

In another embodiment, a traditional coin payment machine coupled with a banknote reader of the LANDIS GYR type may also be envisaged. This electronic coin payment machine is intended, in a known manner, to detect and identify the coins as well as the banknotes inserted, transmitting this information to a management unit (30), which then counts down the sums actually deposited and engages, when the total is reached, the interactive choice process identical to that previously described.

Figure 2:
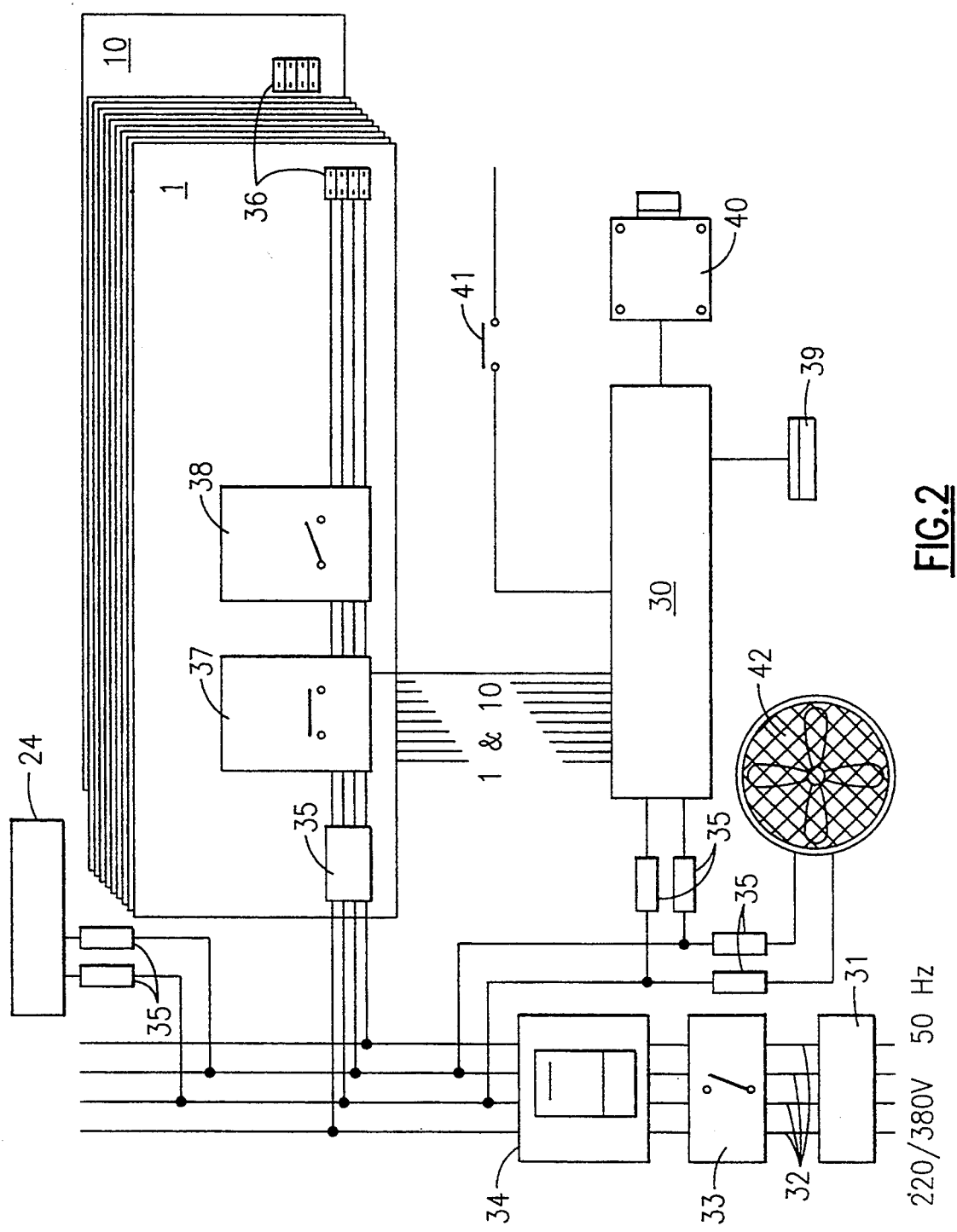
FIG. 2 is a schematic representation, also simplified, of the block diagram of the management booth of the installation according to the invention.

The transaction interface point (24) is therefore managed by the management unit (30), which in addition manages the distribution of electricity. Referring to FIG. 2, it is seen that the transaction interface point (24) and the management unit (30) are supplied from the three phase 220 V/380 V 50 Herz electric supply grid (32). The latter comprises at the output of a terminal board (31), in a conventional manner, an isolating switch (33) as well as a meter (34), thus making it possible to count down the quantity of electricity actually used by the entire electricity delivery device.

The management unit (30), typically consisting of a processing card of the microcomputer type, manages the dialog with the transaction interface point (24), and also controls the operation of the cabinet (23).

The latter comprises, on the one hand, the input fuses (35), ten three-phase outputs, typically at 32 amps, a contactor (37) and a circuit breaker (38) for each of the terminals (1–10).

This cabinet (23), integrated with the management booth (22), can be accessed through a door, whose latch (40) is also managed by the management unit (30). Thus, as soon as the transaction is validated, the management unit (30) disengages the latch of the door (40), thus allowing the user to re-engage the circuit breaker of the terminal in question, in the case when the latter has tripped, for example because of an insulation defect. Furthermore, the electricity can actually be delivered at each of the terminals only when the door of said cabinet (23) is closed, this being ensured using a door closure control (41), also connected to the management unit (30).

In one variant of the invention, each of the terminals (1–10) comprises its own cabinet, incorporating the circuit breaker in question.

FIG. 2 also gives the simplified schematic of the block diagram of the booth (22) of the invention. Thus, an interface of the RS 232 type has been represented by the reference (39), which is intended for connecting the management unit (30) into the switched telephone network or an integrated services digital network. As already pointed out, this connection makes it possible to ensure operation of the bank card reader. Furthermore, this connection is also intended to make it possible to carry out remote maintenance of the device of the invention, thereby facilitating management of such installations.

Finally, and conventionally, this installation comprises a fan (42) intended to allow the enclosed space of the electric circuit to be ventilated.

It is thus seen that, with the device according to the invention, it is possible to provide a self-contained device for self-service delivery of electrical energy, whose operation is particularly simple and user-friendly, so as to encourage their use.

In addition to the obvious advantage of such installations in the scope of refrigerated haulage units, namely, in particular decreasing atmospheric pollution and pollution generated by the noise of the heat engines, such a device will also prove of great interest when it is desired to have available an electric supply source in public places.

In parallel, this self-contained device has numerous other applications, in particular in sailing harbors, commercial ports, for licensed market traders, for tourist buses (operating with air conditioning), and also for camping and trailer camping enthusiasts.

Finally, it will find a quite natural application for recharging batteries/accumulators of vehicles with electric motors.

We claim:

1. A self-contained device for self-service delivery of electrical energy, comprising:
   a plurality of delivery terminals, each delivery terminal capable of being connected to an electrical appliance; and
   a central management unit, operable independently of said delivery terminals, for:
   (1) managing distribution of electricity from an electrical supply grid to each of said delivery terminals,
   (2) managing interaction between a prepayment instrument and users of said delivery terminals, and
   (3) managing connection of said delivery terminals to the electrical supply grid for transmission of electricity therebetween for a selected one of a period of time and a quantity of electricity, said time and quantity being determined in response to a signal from said prepayment instrument indicating prepayment by a user so that said delivery terminals are powered up only after authorization is given by said central management unit.

2. A device of claim 1 wherein said prepayment instrument comprises a transaction interface point comprising a keyboard and a screen, said transaction interface point being connected to said management unit for allowing the user to select from among time duration and quantity of electricity supplied and said screen displaying interactive dialog between the user and said management unit.

3. The device of claim 1 wherein said prepayment instrument comprises a bank card reader coupled to a modem, said modem being connected to a network, the network being selected from the group consisting of a switched telephone network and a digital service interrogation network, the network connecting with a electronic funds transfer center of a bank.

4. The device of claim 1 wherein said prepayment instrument comprises a reader for payment cards, said payment cards having a value that is decremented at each operation, said value being decremented by said central management unit as a function of the selected time period of amount of electricity transmitted between the supply grid and said delivery terminal.

5. The device of claim 1 wherein said prepayment instrument comprises a machine having slots for insertion therein of coins and banknotes, and a banknote reader, said prepayment instrument cooperating with said management unit to determined a sum of currency deposited prior to transmitting electricity.

6. The device of claim 1 further comprising a lockable cabinet, said cabinet containing:
   a termination point for the electrical supply grid,
   a starting point for connections to said delivery terminals,
   a contactor that is controlled by said central management unit, and
   a circuit breaker.

7. The device of claim 6 wherein said lockable cabinet is unlocked upon validation of payment by the user and is locked following completion of transmission of electricity.

8. The device of claim 1 wherein each delivery terminal is provided with a lockable cabinet, each lockable cabinet having a circuit breaker and contactor, said contactor opening and closing in response to control by said central management unit and each of said contactors and circuit breakers working independently of other cabinet's contactors and circuit breakers.

9. A self-contained device for self-service delivery of electrical energy for refrigerated trucks, said device located in one of the group of locations comprising laybys and rest areas, said device comprising:
   a plurality of delivery terminals capable of being connected to refrigeration units of said trucks; and
   a transaction interface point comprising:
   a central management unit capable of managing distribution of electricity at each of said delivery terminals, the electricity originating from an electrical supply grid, said central management unit being capable of managing interactions between users of said delivery terminals and a prepayment instrument, said prepayment instrument comprising:
   a bank card reader,
   a modem connected to a network, selected from one of the group of networks consisting a switched telephone network an an integrated services digital network, the network allowing connection to a bank electronic funds transfer center,
   said management unit managing a connection between a give delivery terminal and the electrical supply grid for transmission of electricity in response to prepayment by a user so that said delivery terminals are powered up only after authorization is given by said central management unit;
   a keyboard, for user input specifying payment and mode of supply of electricity, said keyboard being connected to said central management unit; and
   a screen for displaying interaction between the user and said central management unit, said screen being connected to said central management unit.

10. A method for dispensing electrical energy to self service users comprising the steps of:
   having the user indicate a delivery terminal to which electricity is to be supplied;
   having the user select a mode for dispensing electricity, said mode being one of a period of time and a quantity of electricity;
   having the user select the amount of electricity to be dispensed according to the selected mode;
   obtaining prepayment from a user;
   transmitting information concerning the prepayment, the mode of dispensing, and the amount of electricity to a central management unit; electricity to a central management unit;
   completing a connection between the selected delivery terminal and an delivery terminal is powered up only after authorization is given by said central management unit;
   supplying electrical energy to the selected delivery terminal for a period of time in accordance with the user's prepayment; and
   disconnecting the connection between the selected delivery terminal and an electrical supply grid upon direction by said central management unit, so that said delivery terminal is no longer powered up.

11. The method of claim 10 wherein said step of obtaining prepayment comprises:
   accepting a debit card from the user; and
   decrementing the debit card in proportion to the amount of energy to be supplied.

12. The method of claim 10 wherein said step of obtaining prepayment comprises:
   accepting a credit card from the user; and
   debiting an account of the user via a telephone link.

13. The method of claim 10 wherein said step of obtaining prepayment comprises:
   accepting currency from the user;
   determining the amount of currency deposited by the user.

14. The method of claim 10 further comprising the steps of:
   unlocking a lockable cabinet wherein is located a circuit breaker and contactor after prepayment by the user; and
   locking said lockable cabinet after the electrical energy is supplied.

* * * * *